United States Patent
Tomatsu et al.

(10) Patent No.: US 10,150,385 B2
(45) Date of Patent: Dec. 11, 2018

(54) OCCUPANT DISCRIMINATION SYSTEM OF VEHICLE SEAT

(71) Applicant: AISIN SEIKI KABUSHIKI KAISHA, Kariya-shi (JP)

(72) Inventors: Yoshiaki Tomatsu, Toyoake (JP); Isao Honda, Chiryu (JP); Shintaro Nakaya, Obu (JP); Takahiro Izuno, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 110 days.

(21) Appl. No.: 15/192,552

(22) Filed: Jun. 24, 2016

(65) Prior Publication Data

US 2016/0375798 A1    Dec. 29, 2016

(30) Foreign Application Priority Data

Jun. 29, 2015 (JP) ................................. 2012-129879
May 25, 2016 (JP) ................................. 2016-104260

(51) Int. Cl.
*B60N 2/00* (2006.01)
*B60R 21/015* (2006.01)

(52) U.S. Cl.
CPC ........ *B60N 2/002* (2013.01); *B60R 21/01516* (2014.10); *B60R 21/01556* (2014.10)

(58) Field of Classification Search
CPC .............. B60N 2/002; B60R 21/01556; B60R 21/01516
See application file for complete search history.

(56) References Cited

U.S. PATENT DOCUMENTS

| | | | | |
|---|---|---|---|---|
| 6,007,094 A | * | 12/1999 | Hosoda | B60R 21/01512 280/735 |
| 6,253,133 B1 | * | 6/2001 | Sakai | B60R 21/01532 180/268 |
| 6,509,653 B2 | * | 1/2003 | Fujimoto | B60R 21/01516 180/273 |
| 6,662,094 B2 | * | 12/2003 | Murphy | B60R 21/01516 180/271 |
| 6,727,823 B2 | * | 4/2004 | Ando | B60N 2/002 180/271 |
| 6,957,591 B2 | | 10/2005 | Takafuji et al. | |
| 7,032,968 B2 | * | 4/2006 | Sakai | B60R 21/01556 280/735 |
| 7,772,985 B2 | * | 8/2010 | Kobayashi | B60R 21/01556 297/217.2 |

(Continued)

FOREIGN PATENT DOCUMENTS

| | | |
|---|---|---|
| JP | 2003-240628 | 8/2003 |
| JP | 2011-17592 | 1/2011 |
| JP | 2014-162402 | 9/2014 |

*Primary Examiner* — John Olszewski
*Assistant Examiner* — Jeffrey C Boomer
(74) *Attorney, Agent, or Firm* — Oblon, McClelland, Maier & Neustadt, L.L.P.

(57) ABSTRACT

An occupant discrimination system of a vehicle seat includes a load detecting portion disposed on a lower side of a seat and detecting a load acting on the seat; an occupant discrimination portion discriminating a state of an occupant among a no occupant state, adult seated state, and child seat fixed states based at least on a load detected from the load detecting portion and a load continuation duration.

4 Claims, 7 Drawing Sheets

(56) References Cited

U.S. PATENT DOCUMENTS

| | | | |
|---|---|---|---|
| 8,433,476 B2* | 4/2013 | Inayoshi | B60N 2/002 |
| | | | 180/268 |
| 8,445,792 B2 | 5/2013 | Ito et al. | |
| 2002/0024257 A1* | 2/2002 | Fujimoto | B60R 21/01516 |
| | | | 307/10.1 |
| 2003/0033065 A1* | 2/2003 | Vos | B60R 21/01516 |
| | | | 701/45 |
| 2003/0074121 A1* | 4/2003 | Sakai | B60N 2/002 |
| | | | 701/45 |
| 2003/0168895 A1* | 9/2003 | Sakai | B60R 21/01556 |
| | | | 297/216.12 |
| 2006/0044127 A1* | 3/2006 | Ho | B60N 2/002 |
| | | | 340/457 |
| 2006/0265113 A1* | 11/2006 | Kobayashi | B60R 21/01556 |
| | | | 701/45 |
| 2008/0054690 A1* | 3/2008 | Inayoshi | B60R 21/01516 |
| | | | 297/216.1 |
| 2008/0091316 A1* | 4/2008 | Szczublewski | H02J 7/0032 |
| | | | 701/36 |
| 2011/0010037 A1* | 1/2011 | Inayoshi | B60N 2/002 |
| | | | 701/31.4 |
| 2011/0010109 A1* | 1/2011 | Ito | B60N 2/002 |
| | | | 702/41 |
| 2013/0218487 A1* | 8/2013 | Fujii | B60R 22/48 |
| | | | 702/41 |
| 2014/0277826 A1* | 9/2014 | Fujii | B60R 21/01516 |
| | | | 701/1 |
| 2017/0240022 A1* | 8/2017 | Ireri | B60H 1/00742 |

\* cited by examiner

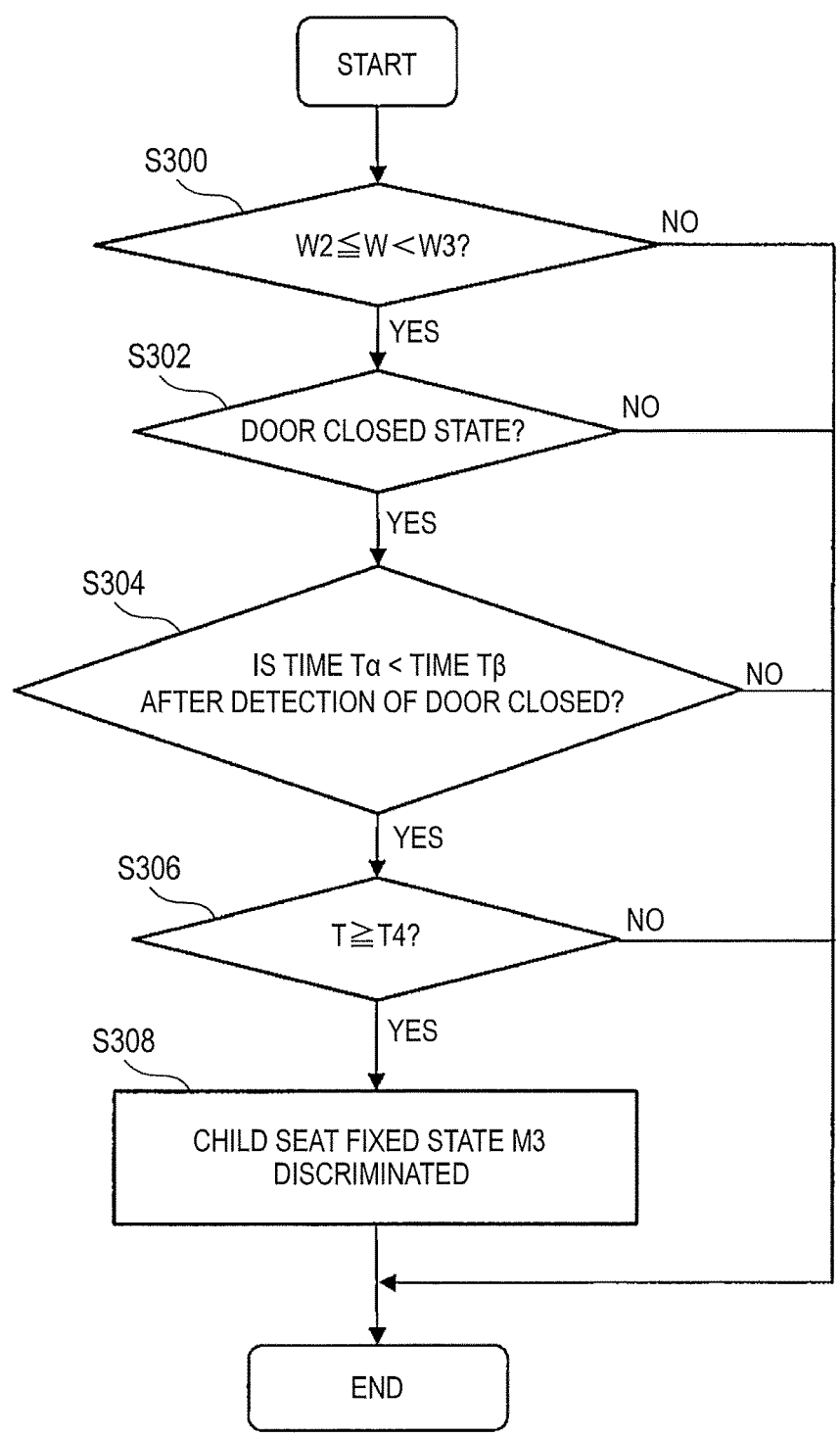

OCCUPANT DISCRIMINATION SYSTEM OF VEHICLE SEAT

CROSS REFERENCE TO RELATED APPLICATIONS

This application is based on and claims priority under 35 U.S.C. § 119 to Japanese Patent Application 2015-129879, filed on Jun. 29, 2015, and Japanese Patent Application 2016-104260, filed on May 25, 2016, the entire contents of which are incorporated herein by reference.

TECHNICAL FIELD

This disclosure relates to an occupant discrimination system which uses a load detection sensor for occupant discrimination that is provided in a vehicle seat.

BACKGROUND DISCUSSION

In recent years, in order to improve performance of various safety devices such as a seat belt or an air bag which is equipped in an automobile, there are cases where operation of the safety devices is controlled in accordance with the weight of the occupant who is seated on a seat. For example, in North America, there is a problem in that harm is caused to a child who is seated in a child seat due to an impact during deployment of the air bag in a child seat fastened state such that the child seat is fastened oriented to the rear on the front passenger seat. Thereby, in the child seat fastened state such that the child seat is fastened oriented to the rear on the front passenger seat, it is determined that deployment of the air bag is prohibited. In this manner, correctly determining a seat load by detecting the load which acts on the seat is extremely important.

As the related art, there is a child seat detection device or a child seat detection method described in JP 2007-76598A (Reference 1). Reference 1 discloses that a plurality of load sensors that are provided in a vehicle seat are provided in the child seat detection device which detects whether the child seat is mounted on the vehicle seat, in which when the child seat is fixed, the closest load sensor to an anchor of the seat belt on which a large load acts is set as a specific sensor, and it is determined whether the child seat is mounted using a load value which is detected by a load sensor that does not include the specific sensor.

According to the child seat detection device or the child seat detection method, it is possible to detect with high precision whether the child seat is mounted using the detection value of the load sensor other than the specific sensor on which the large load acts.

In addition, in an air bag system of a vehicle described in JP 10-194080A (Reference 2), it is disclosed that in a case where the door is detected to be in a closed state, the current control state is held.

According to the air bag system of a vehicle, it is possible to prevent improper performance of switching of necessity for air bag deployment within the door closed state under the premise that there is little change of presence or absence of an occupant and presence or absence, orientation, and the like of a child seat which is mounted on a seat within the door closed state.

However, when a child seat is mounted on a vehicle seat, there are times when the mounter of the child seat rests on a seat cushion. In this case, a load of the mounter is applied on a load detection device which is installed on a lower side of the vehicle seat, and the load which is detected by the load detection device increases. When the load which is detected by the load detection device increases, there are times when an occupant discrimination portion discriminates that there is an adult regardless of the child seat being mounted.

In such a case, in the child seat detection device or the child seat detection method described in Reference 1, there is a concern that it is determined that an adult is seated regardless of the child seat resting on a vehicle seat since the detected load of the load sensor other than a specified sensor increases.

In addition, in Reference 2, in the case of the door open state, there is a concern that when the detected load of the load sensor increases due to the mounting of the child seat since a control state is not maintained, it is determined that an adult is seated on the seat.

SUMMARY

Thus, a need exists for an occupant discrimination system of a vehicle which is not susceptible to the drawback mentioned above.

An occupant discrimination system of a vehicle seat according to an aspect of this disclosure includes a load detecting portion which is disposed on a lower side of a seat of the vehicle and which detects a load that acts on the seat, an occupant discrimination portion which discriminates a state of an occupant who is seated on the seat among a no occupant state, an adult seated state, and a child seat fixed state based on a state transition condition on the basis of a load which is detected from the load detecting portion and a load continuation duration, and a door opening and closing detecting portion which detects an opening and closing state of a door of the vehicle, in which the occupant discrimination portion changes the state transition condition from the no occupant state or the child seat fixed state to the adult seated state such that it is difficult to transition in a state in which the door is detected to be in an open state by the door opening and closing detecting portion in comparison to a state in which the door is detected to be in a closed state.

BRIEF DESCRIPTION OF THE DRAWINGS

The foregoing and additional features and characteristics of this disclosure will become more apparent from the following detailed description considered with the reference to the accompanying drawings, wherein:

FIG. 8 is a flow chart illustrating a determination operation of Embodiment 2.

DETAILED DESCRIPTION

An embodiment of a vehicle seat 11 which is provided with an occupant discrimination system of a vehicle 10 disclosed here is described with reference to the drawings. Here, "front and rear, left and right, up and down" directions which are used in the specification disclosed here are described with reference to each direction of the vehicle viewed from an occupant who is seated on the vehicle seat 11. In addition, in the embodiment disclosed here, the vehicle is left-hand drive, and presence or absence of an occupant who is seated on a front passenger seat is determined.

Embodiment 1

Figure 1:
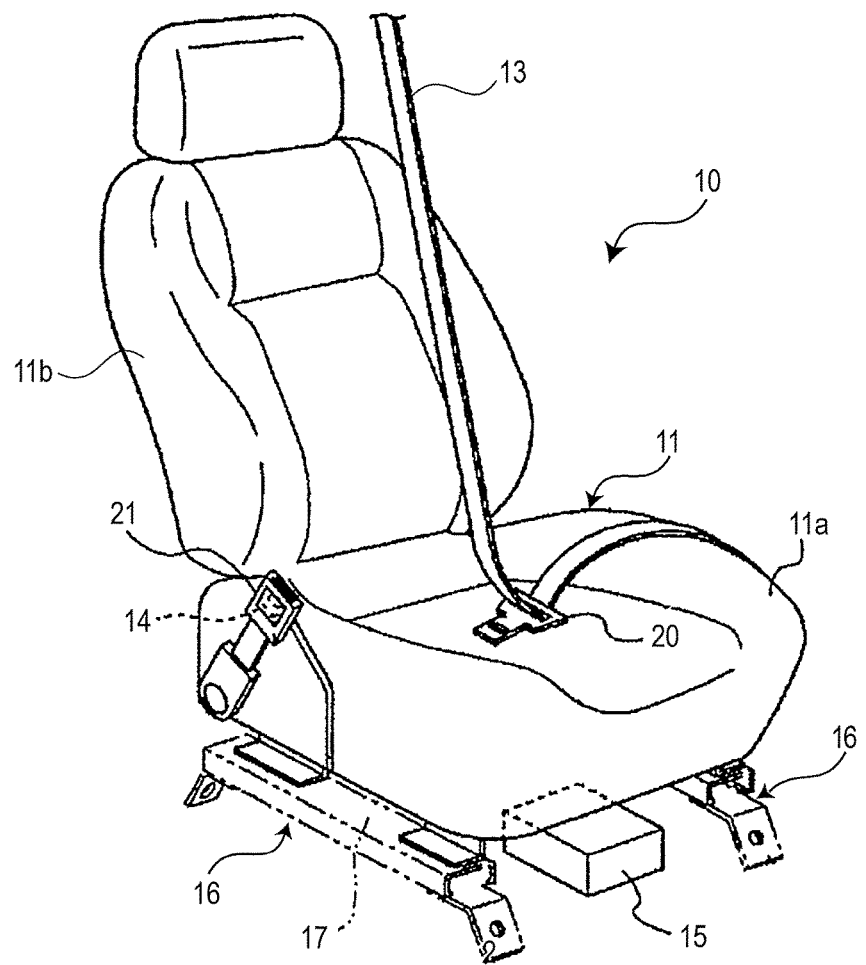
FIG. 1 is a perspective view of a vehicle seat which is provided with an occupant discrimination system of the vehicle of an embodiment disclosed here.

As shown in FIG. 1, the vehicle seat 11 is provided with a seat cushion 11a as a seating surface on which the occupant is seated and a seat back 11b which functions as a back rest for the occupant. In addition, a load detection device 12 (refer to FIG. 2) as a load detecting portion which detects the occupant who is seated on the seat or a load of luggage, a seat belt 13 which restrains the occupant who is seated on the vehicle seat 11 while mounted and is released while unmounted, and a buckle switch 14 which detects whether or not a seat belt clip 20 and a seat belt buckle 21 are in an engaged state or a non-engaged state are provided on the vehicle seat 11. Furthermore, the vehicle seat 11 is supported on a floor of the vehicle via a pair of left and right upper rails 17 of a seat slide device 16 that supports the vehicle seat 11 such that position adjustment is possible in the front and back direction of the vehicle.

Figure 2:
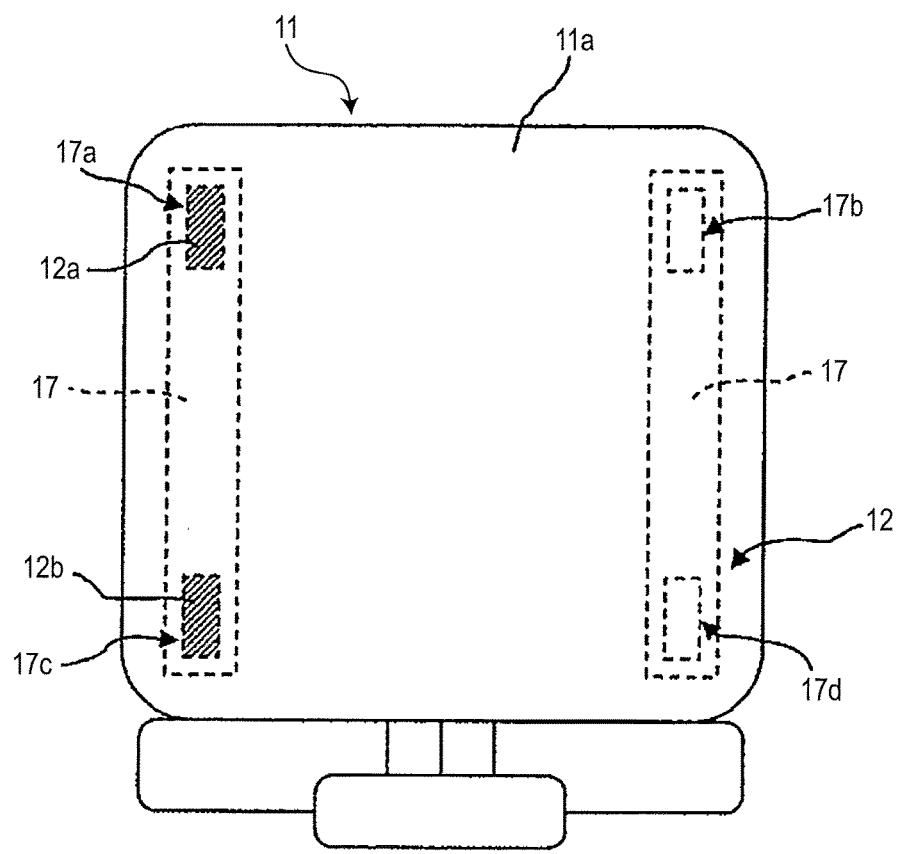
FIG. 2 is a diagram of the vehicle seat viewed from above.

As shown in FIG. 2, four support leg portions 17a, 17b, 17c, and 17d which support the seat cushion 11a of the vehicle seat 11 on the pair of left and right upper rails 17 are disposed at four corner positions that are respectively separated in the left and right direction and the front and back direction of the vehicle.

The load detection device 12 is configured by two load sensors 12a and 12b. The load sensors 12a and 12b consist of strain gage type sensors in which an amplifier is built in. The load sensors 12a and 12b are disposed between the seat cushion 11a and the upper rails 17 at two locations at the front and rear at the left and right side among the four support leg portions 17a to 17d. The load of the occupant and the like who is seated on the seat cushion 11a of the vehicle seat 11 is detected by the two load sensors 12a and 12b.

Figure 3:
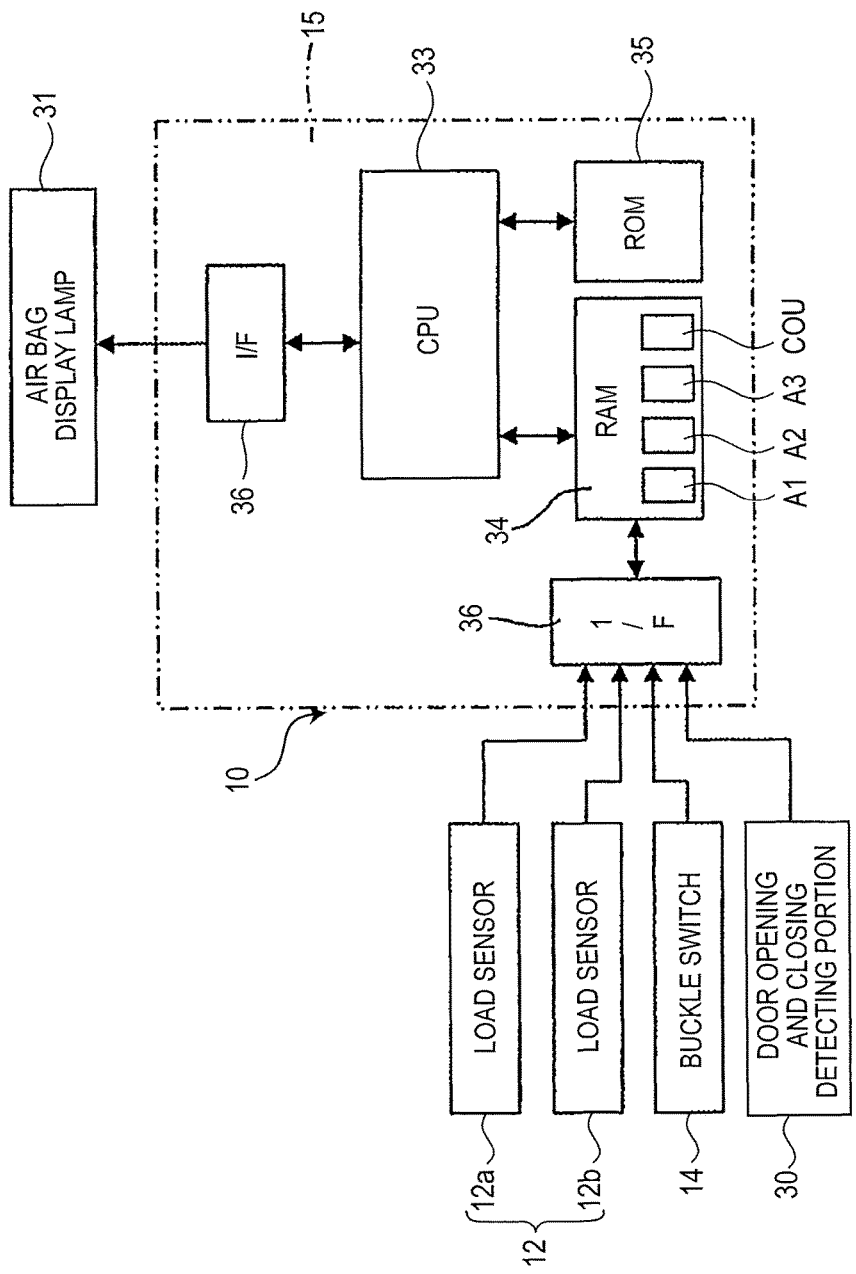
FIG. 3 is a block diagram of the occupant discrimination system of the vehicle.

FIG. 3 illustrates a block diagram of the occupant discrimination system of a vehicle 10, and a controller 15 as the occupant discrimination portion consists of a central processing unit (CPU) 33, a random access memory (RAM) 34, a read only memory (ROM) 35, and an interface 36. A load signal which is detected by the two load sensors 12a and 12b, an ON/OFF signal of the buckle switch 14 of the vehicle seat 11 of the front passenger seat, and an ON/OFF signal of a door opening and closing detecting portion 30 which detects opening and closing of the door on the front passenger seat side are input to the RAM 34 via the interface 36. A seat occupant determination program of a vehicle is stored in the ROM 35. The CPU 33 detects weight of the occupant who is seated on the vehicle seat 11 or weight of the placed luggage by carrying out addition processing on the load signal from the two load sensors 12a and 12b which is transmitted to the RAM 34.

Figure 4:
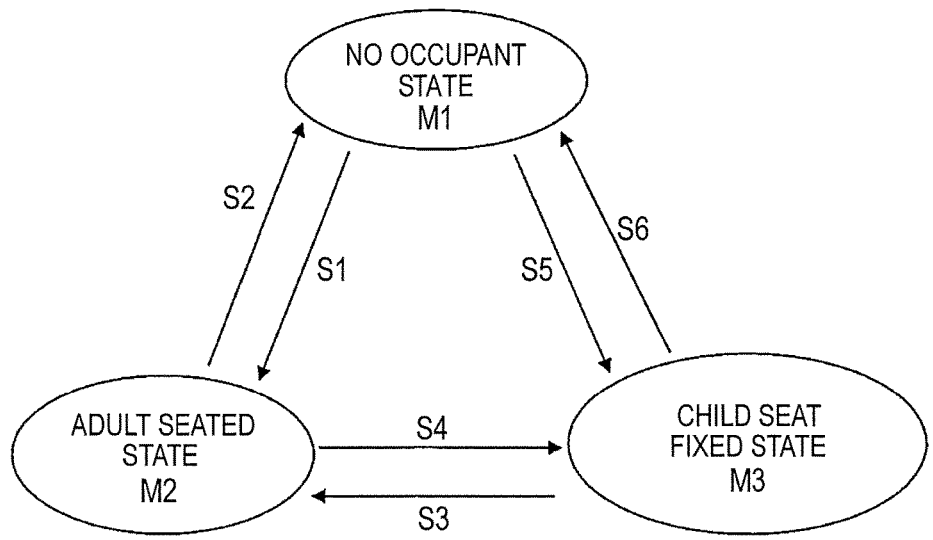
FIG. 4 is a diagram illustrating a transition state of the occupant discrimination system of the vehicle.

As shown in FIG. 4, the controller 15 performs transition processes in S1 to S6 respectively between a no occupant state M1 which recognizes a state in which the occupant is not seated on the vehicle seat 11, an adult seated state M2 which recognizes a state in which the occupant is seated on the vehicle seat 11, and a child seat fixed state M3 which recognizes a placed state of the child seat on the vehicle seat 11. Determination is performed of the state of the vehicle seat 11 among the states of the no occupant state M1, the adult seated state M2, and the child seat fixed state M3 according to the transition processes S1 to S6. The transition processes S1 to S6 will be described below.

In transition process S1, in the determination state of the no occupant state M1, the controller 15 transitions continuous detection by the load detection device 12 of a first time T1 which sets in advance the load of a first load W1 or more to the determination state of the adult seated state M2 as the state transition condition. Here, in the embodiment disclosed here, a first reference time T1a (first continuation duration) and a first modified time T1b (second continuation duration) are set as the first time T1, and either one is selected according to vehicle conditions. In addition, the first reference time T1a and the first modified time T1b are set such that "T1a<T1b". The first modified time T1b of the embodiment disclosed here is set to be longer than a time in which the load W that is detected by the load detection device 12 is the first load W1 or more by the mounter riding on the vehicle seat 11 when the mounter mounts the child seat on the vehicle seat 11.

In transition process S2, in the determination state of the adult seated state M2, the controller 15 transitions continuous detection by the load detection device 12 of a second time T2 which sets in advance a load which is shorter than the second load W2 to the determination state of the no occupant state M1 as the state transition condition.

In transition process S3, in the determination state of the child seat fixed state M3, the controller 15 transitions continuous detection by the load detection device 12 of a third time T3 which sets in advance the load of the first load W1 or more to the determination state of the adult seated state M2 as the state transition condition. Here, in the embodiment disclosed here, a third reference time T3a (first continuation duration) and a third modified time T3b (second continuation duration) are set as the third time T3, and either one is selected according to vehicle conditions. In addition, the third reference time T3a and the third modified time T3b are set such that "T3a<T3b". The third modified time T3b of the embodiment disclosed here is set to be longer than a time in which the load W that is detected by the load detection device 12 is the first load W1 or more due to the mounter riding on the vehicle seat 11 when the mounter mounts the child seat on the vehicle seat 11.

In transition process S4, in the determination state of the adult seated state M2, the controller 15 transitions continuous detection by the load detection device 12 of a fourth time T4 which sets in advance a load of the second load W2 or more which is a load that is smaller than the third load W3 to the determination state of the child seat fixed state M3 as the state transition condition.

In transition process S5, in the determination state of the no occupant state M1, the controller 15 transitions continuous detection by the load detection device 12 of a fifth time T5 which sets in advance a load that is smaller than the first load W1 by the third load W3 or more to the determination state of the child seat fixed state M3 as the state transition condition.

Figure 5:
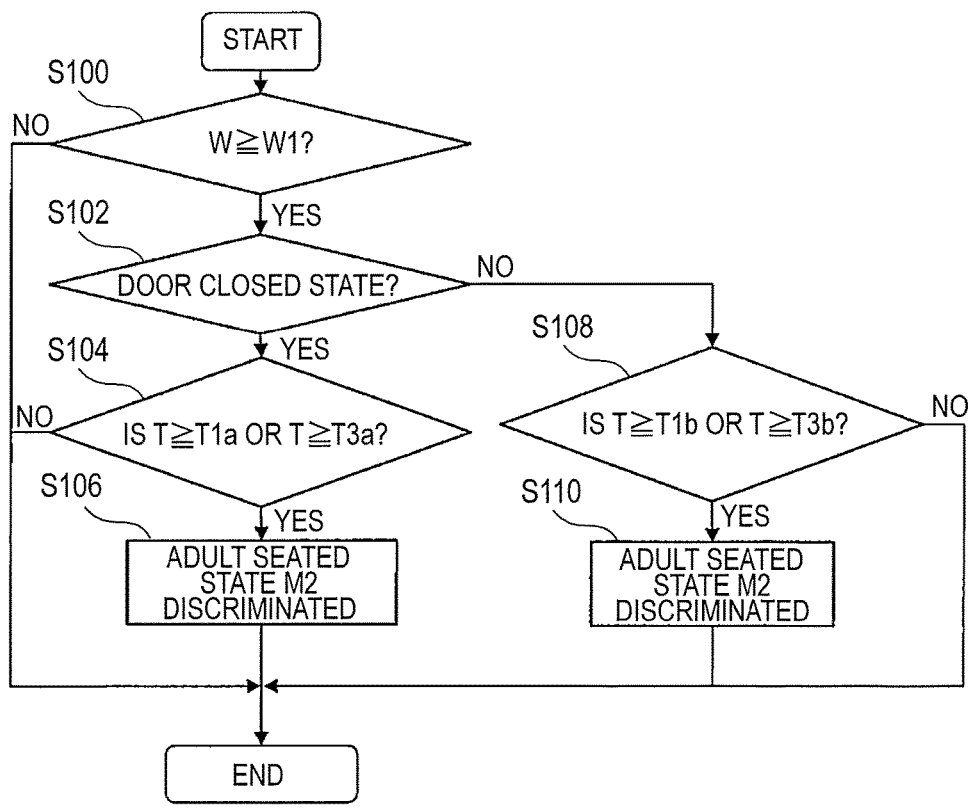
FIG. 5 is a flow chart illustrating a determination operation of Embodiment 1.

In transition process S6, in the determination state of the child seat fixed state M3, the controller 15 transitions continuous detection by the load detection device 12 of a sixth time T6 which sets in advance a load which is smaller than the second load W2 to the determination state of the no occupant state M1 as the state transition condition. Next, a state transition process of the embodiment disclosed here which is executed by the controller 15 will be described with reference to a flow chart which is illustrated in FIG. 5.

Here, the state transition process (transition process S1) from the no occupant state M1 to the adult seated state M2 or the state transition process (transition process S3) from the child seat fixed state M3 to the adult seated state M2 will be described.

When an ignition switch of the vehicle is switched ON, the seat occupant determination program of a vehicle is started. The seat occupant determination program of a vehicle is repeatedly executed in a predetermined sampling period.

In a discrimination state of the no occupant state M1 or the child seat fixed state M3, first, in step S100, it is determined whether or not load (set as "detected load" below) W which is detected in the load detection device 12 is the first load W1 or more which is the state transition condition. As a result, in a case where the detected load W is not the first load W1 or more, the process here temporarily ends, and in a case where the detected load W is the first load W1 or more, the process of step S102 is performed.

In step S102, it is determined whether or not the door is in the closed state based on the detection signal from the door opening and closing detecting portion 30. As a result, in a case where it is determined that the door is in the closed state, the process of step S104 is performed.

In step S104, it is determined whether or not the time T in a state in which the detected load W is the first load W1 or more is continued until the first reference time T1$a$ or the third reference time T3$a$ or later. In step S104, the first reference time T1$a$ or the third reference time T3$a$ is selected as the first time T1 or the third time T3. As a result, in a case where it is determined that "T≥T1$a$" or "T≥T3$a$" is established, the adult seated state M2 is discriminated in step S106, and the seat occupant determination program of a vehicle ends. That is, the occupant discrimination state of the controller 15 in this state transitions from the no occupant state M1 or the child seat fixed state M3 to the adult seated state M2. Meanwhile, in step S104, in a case where "T≥T1$a$" or "T≥T3$a$" is not established, the process here is temporarily ended without a transition to the adult seated state M2 being performed.

Here, in step S102 in a case where the door is determined to be in the open state, in step S108 it is determined whether or not the time T in a state in which the detected load W is the first load W1 or more is continued to a first modified time T1$b$ or a third modified time T3$b$ or later. In step S108, the first modified time T1$b$ or the third modified time T3$b$ is selected as the first time T1 or the third time T3. As a result, in a case where it is determined that "T≥T1$b$" or "T≥T3$b$" is established, the adult seated state M2 is discriminated in step S110 and the seat occupant determination program of a vehicle ends. That is, the occupant discrimination state of the controller 15 in this state transitions from the no occupant state M1 or the child seat fixed state M3 to the adult seated state M2. Meanwhile, in step S110, in a case where "T≥T1$b$" or "T≥T3$b$" is not established, the process here is temporarily ended without transition to the adult seated state M2 being performed.

As above, the controller 15 changes the time that the first load W1 or more of the state transition condition of transition processes S1 and S3 which relates to the state transition from the no occupant state M1 or the child seat fixed state M3 to the adult seated state M2 continues in a case where the door is in the open state, and in a case where the door is in the closed state. In particular, the controller 15 performs the transition processes S1 and S3 based on the first modified time T1$b$ or the third modified time T3$b$ such that it is difficult for the transition to be carried out from the no occupant state M1 or the child seat fixed state M3 to the adult seated state M2 in the case where the door is in the open state in comparison to the door in the closed state.

Next, when the mounter mounts the child seat on the vehicle seat, a case where the state transition is transitioned to the adult seated state M2 by the occupant discrimination portion, the state of the vehicle seat 11 and the operation of the mounter are described in (State 1) to (State 7) below.

The mounter places the child seat on the seat cushion 11$a$ (State 1) in the state in which nothing is mounted (State 2). The mounter places the child seat on the seat cushion 11$a$ in order to engage the seat belt clip 20 with the seat belt buckle 21 (State 3). The mounter engages the seat belt clip 20 with the seat belt buckle 21 (State 4). After engaging the seat belt clip 20 with the seat belt buckle 21, the mounter is removed from on the seat cushion 11$a$ (State 5), and there is a state in which only the child seat is placed on the seat cushion 11$a$ (State 6). The mounter places an infant on the child seat (State 7). From the above, mounting by the mounter of the child seat on the vehicle seat ends.

Figure 6:
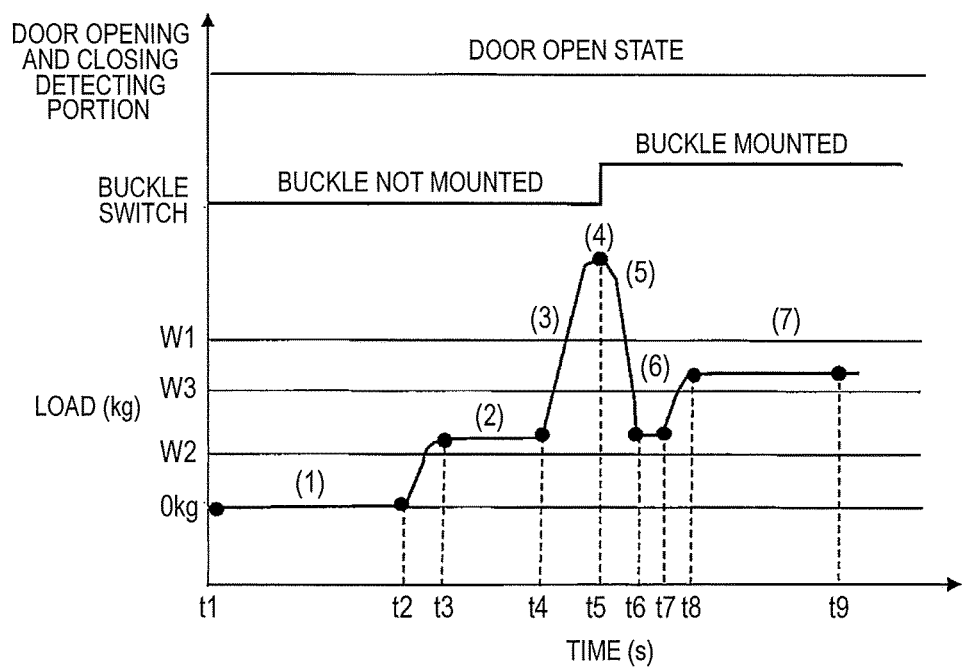
FIG. 6 is a diagram illustrating an example of a load variation when a mounter mounts a child seat on the vehicle seat.

FIG. 6 illustrates an example of variation of the detected load W when the mounter mounts the child seat on the vehicle seat 11. Description is made below with reference to variation of the detected load W in FIG. 6 and (State 1) to (State 7) that indicate the state of the vehicle seat 11 and operations of the mounter described above. Here, in the drawings, (State 1) to (State 7) are simply represented by (1) to (7).

Between times t1 to t2 which are indicated in the drawings represents the state of (State 1) above. In this case, there is a state in which nothing is placed on the vehicle seat 11, and the detected load W is the second load W2 or less. Between times t3 to t4 represents the state of (State 2) above. In this case, since only the child seat is placed on the vehicle seat 11, the detected load W detects the load of a portion of the weight of the child seat, and the detected load W is larger than the second load W2 and is smaller than the third load W3. Between times t4 to t5 represents the state of (State 3) above. Here, the detected load W exceeds the first load W1 due to the mounter placing on the vehicle seat 11.

Time t5 represents the state of (State 4) above. When the mounter engages the seat belt clip 20 with the seat belt buckle 21, the load of the mounter is mostly applied to the vehicle seat 11, and the detected load W is largest.

Between times t5 to t6 represents the state of (State 5) above. The detected load W is reduced to a load of a portion of the weight of the child seat due to the mounter being removed from on the vehicle seat 11.

Between times t6 to t7 represents the state of (State 6) above. Here, the load of a portion of the weight of the child seat is detected in the detected load W. In this case, the detected load W is smaller than the third load W3 and is larger than the second load W2.

Between times t8 to t9 represents the state of (State 7) above. The load of a portion of the weight of the child seat and the infant is detected in the detected load W due to the mounter placing the infant on the child seat, and the detected load W is larger than the third load W3 and is smaller than the first load W1.

As described above, when the mounter mounts the child seat on the vehicle seat 11, when the detected load W exceeds the first load W1, the transition process S1 or S3 is established, and then the transition processes S2 and S4 are not established, there is a concern that the state is transitioned to the adult seated state M2 regardless of whether the child seat is placed on the vehicle seat 11.

However, in the embodiment disclosed here, the first reference time T1a and the third reference time T3a which are conditions of a state in which it is detected that the door is in the closed state and the first modified time T1b and the third modified time T3b which are conditions of a state in which it is detected that the door is in the open state are set as the first time T1 and the third time T3 which are conditions of the transition processes S1 and S3, and respectively "T1b>T1a" and "T3b>T3a" are set. For this reason, in a case where mounting of the child seat is performed in the state in which the door is open, time with the first load W1 or more tends not to exceed the first modified time T1b and the third modified time T3b in (State 3) and (State 4) above. In particular, in the embodiment disclosed here, the first modified time T1b and the third modified time T3b are set to be longer than a time in which the load W that is detected by the load detection device 12 is the first load W1 or more due to the mounter riding on the vehicle seat 11 when the mounter mounts the child seat on the vehicle seat 11. Consequently, it is possible to reliably suppress the time in which the load W is the first load W1 or more from exceeding the first modified time T1b and the third modified time T3b.

Accordingly, in (State 3) and (State 4), even if the load is temporarily increased when mounting the child seat on the vehicle seat by the mounter, it is possible that it is difficult for the child seat to transition from the no occupant state M1 or the child seat fixed state M3 to the adult seated state M2. That is, in the application disclosed here, it is possible to improve discrimination precision of the child seat.

Modification Example

Figure 7:
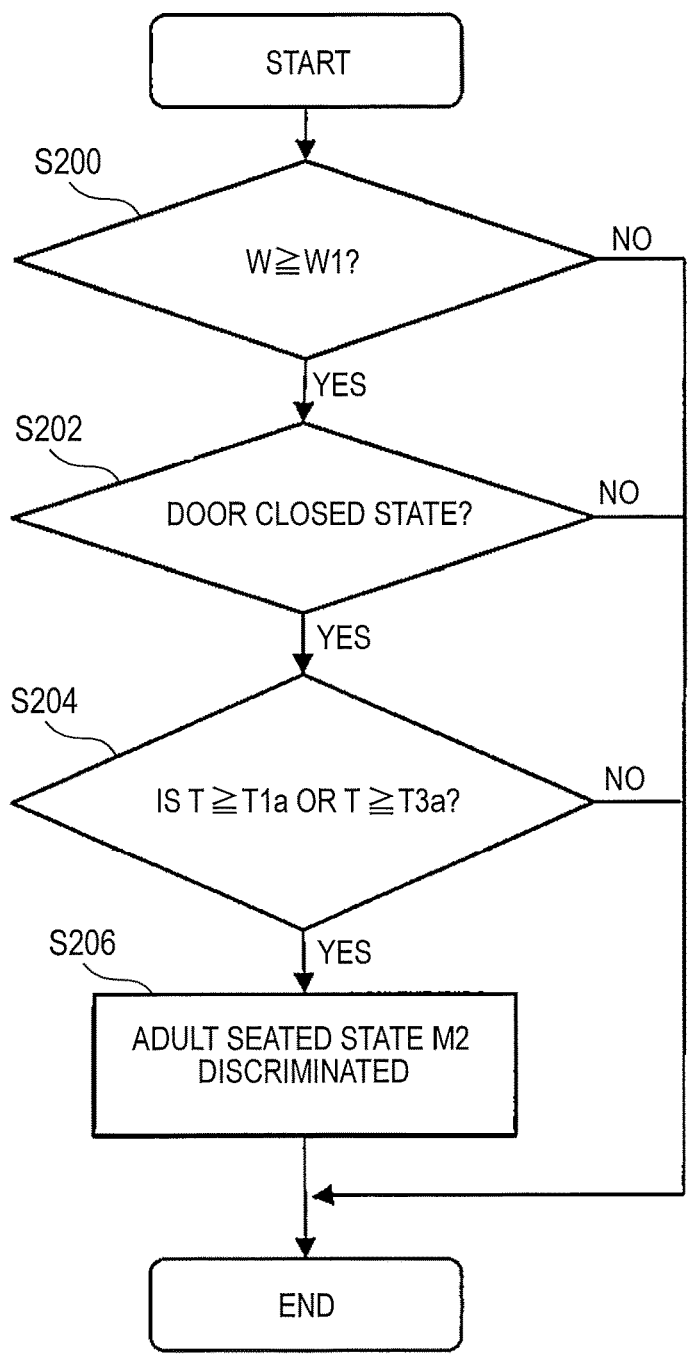
FIG. 7 is a flow chart illustrating a determination operation of a modification example of Embodiment 1.

The determination process is indicated by the flow chart in FIG. 7 as a modification example of the embodiment. Description is made below with reference to the flow chart. Here, since each process of steps S200, S204, and S206 in the flow chart is the same as steps S100, S104, and S106 in the flow chart (FIG. 5) of the first embodiment described above, description is omitted. That is, in the same determination process, in a case where it is determined that the door is in the open state in step S202, the transition processes S1 and S3 are not executed, and the seat occupant determination program of a vehicle ends.

Accordingly, in the modification example, in a case where the door opening and closing detecting portion is in the door open state, even in a case where the load is temporarily increased when mounting on the vehicle seat of the child seat by the mounter, since the child seat does not transition to the determination state of the adult seated state M2 regardless of being placed on the vehicle seat 11, it is possible to improve discrimination precision of the child seat.

As the modification example of the embodiment, the state transition condition which is changed according to the door open state or the door closed state which is detected in the door opening and closing detecting portion 30 may be set as the load condition. For example, in the door opening and closing detecting portion 30, the first load W1 in a case where it is detected that the door is in the closed state is set as a first reference load Wa1 and the first load W1 in a case where it is detected that the door is in the open state is set as a first modified load Wb1. Here, the first modified load Wb1 is set so as to be larger than a value in which the load is temporarily increased when mounting of the child seat on the vehicle seat by the mounter. Thereby, in a case where the door is in the open state, even in a case where the load is temporarily increased when mounting of the child seat on the vehicle seat by the mounter, it is difficult to transition to the determination state of the adult seated state M2.

In the embodiment, the load detection device 12 is disposed between the seat cushion 11a and the upper rails 17 in two locations at the front and rear at the left and right side among the four support leg portions 17a to 17d, however, the load detection device 12 may be disposed in the two front locations or two rear locations among the four support leg portions 17a to 17d. Furthermore, the load detection device 12 may be disposed in four locations of the four support leg portions 17a to 17d.

Embodiment 2

The second embodiment relates to the transition condition of the transition process S4 which relates to the state transition from the adult seated state M2 to the child seat fixed state M3. Here, detailed description of common points with Embodiment 1 described above is omitted. Therefore, a state transition process of the embodiment disclosed here which is executed by the controller 15 will be described with reference to a flow chart which is illustrated in FIG. 8.

First, in step S300, it is determined whether or not the load W which is detected in the load detection device 12 is smaller than the third load W3 that is the second load W2 or more which is the state transition condition of the transition process S4. In a case where the detected load W is smaller than the third load W3 which is the second load W2 or more and the determination result in step S300 is YES, the process progresses to step S302, and in a case where the determination result is NO, the process here temporarily ends without performing a transition to the child seat fixed state M3.

In step S302, it is determined whether or not the door is in the closed state by the door opening and closing detecting portion 30. As a result, the process of step S304 is performed in a case where it is determined that the door is in the closed state, in a case where it is determined that the door is not in the closed state, that is, the door is in the open state, the process here temporarily ends without transition to the child seat fixed state M3 being performed.

In step S304, it is determined whether or not a time Tα after detection of the door closed state by the door opening and closing detecting portion 30 is smaller than a time Tβ that is set in advance. As a result, in a case where it is determined that it is established that "Tα<Tβ", the process progresses to step S306, and in a case where it is determined that it is not established that "Tα<Tβ", the process here temporarily ends without transition to the child seat fixed state M3 being performed.

In step S306, it is determined whether or not a time T in a state where the detected load W is smaller than the third load W3 which is the second load W2 or more is continued for the fourth time T4 or more. As a result, in a case where it is determined that "T≥T4" is established, the child seat fixed state M3 is discriminated in step S308 and the seat occupant determination program of a vehicle ends. Meanwhile, in step S306, in a case where it is determined that "T≧T4" is not established, the process here is temporarily ended without a transition to the child seat fixed state M3 being performed.

That is, in the embodiment disclosed here, in the door open state, until the time Tβ elapses from detection of the door being in the closed state by the door opening and closing detecting portion 30, only in a case where the detected load W of the second load W2 or more and less than the third load W3 is detected to be continued for the fourth time T4, the state transition from the adult seated state M2 to the child seat fixed state M3 is performed. In other words, after the time T8 has elapsed after the door is detected to be in the closed state, the state transition from the adult seated state M2 to the child seat fixed state M3 is prohibited.

Accordingly, according to the occupant discrimination system of a vehicle of the embodiment disclosed here, the following effects are obtained.

When the mounter mounts the child seat on the vehicle seat, even if the adult seated state M2 is determined regardless of the child seat being placed on the vehicle seat due to a temporary increase of the load, if a predetermined time after the door is detected to be in the closed state by the door opening and closing detecting portion 30, it is possible to transition from the adult seated state M2 to the child seat fixed state M3.

In a case where it is determined that outside of the predetermined period after the door is detected to be in the closed state by the door opening and closing detecting portion 30, and the door is determined to be in the open state by the door opening and closing detecting portion 30, it is not possible to transition from the adult seated state M2 to the child seat fixed state M3. That is, in the case outside of the predetermined period after the door is detected to be in the closed state and in a case where the door is in the open state, it is possible to suppress the occupant transitioning from the adult seated state M2 to the child seat fixed state M3 due to a temporary load reduction according to a posture change of the occupant and cornering of the vehicle.

Accordingly, it is possible to anticipate an improvement of detection efficiency of an adult occupant.

An occupant discrimination system of a vehicle seat according to an aspect of this disclosure includes a load detecting portion which is disposed on a lower side of a seat of the vehicle and which detects a load that acts on the seat, an occupant discrimination portion which discriminates a state of an occupant who is seated on the seat among a no occupant state, an adult seated state, and a child seat fixed state based on a state transition condition on the basis of a load which is detected from the load detecting portion and a load continuation duration, and a door opening and closing detecting portion which detects an opening and closing state of a door of the vehicle, in which the occupant discrimination portion changes the state transition condition from the no occupant state or the child seat fixed state to the adult seated state such that it is difficult to transition in a state in which the door is detected to be in an open state by the door opening and closing detecting portion in comparison to a state in which the door is detected to be in a closed state.

Typically, when a mounter fixes a child seat to a seat cushion, there is a tendency that a load of the mounter is applied to the seat cushion of the vehicle and the load which is detected in the load detecting portion is temporarily increased. There is a concern that the adult seated state is determined regardless of the state transition condition from the no occupant state or the child seat fixed state to the adult seated state being satisfied and the child seat being placed on the vehicle seat caused by an increase of such a temporary load.

Therefore, according to the configuration above, it is difficult to transition to the adult seated state in the door open state by changing the state transition condition from the no occupant state or the child seat fixed state to the adult seated state in the case of the door open state and the door closed state. The inventors confirm that in general it is often the case that work in which a mounter fixes the child seat is performed in the door open state. Accordingly, in a case where the door is in the open state, even if the load which is detected in the load detection device is temporarily increased during child seat mounting, determining the adult seated state regardless of the state in which the child seat is placed on the vehicle seat is suppressed.

According to a second aspect of this disclosure, in the occupant discrimination system of a vehicle seat, the occupant discrimination portion may set a first continuation duration which is a state transition condition for transitioning from the no occupant state or the child seat fixed state to the adult seated state in a state in which the door opening and closing detecting portion detects the door open state to be longer than a second continuation duration which is a state transition condition for transitioning from the no occupant state or the child seat fixed state to the adult seated state in a state in which the door opening and closing detecting portion detects the door closed state.

According to the configuration above, it is difficult to transition to the adult seated state in the door open state by setting such that the continuation duration, which is the state transition condition for transitioning from the no occupant state or the child seat fixed state to the adult seated state, is longer in the door open state than the door closed state. Thereby, in a case where the mounter mounts the child seat on the vehicle seat in the door open state, even if the load which is detected in the load detection device is temporarily increased during child seat mounting, it is possible that it is difficult to transition from the no occupant state or the child seat fixed state to the adult seated state.

According to a third aspect of this disclosure, in the occupant discrimination system of a vehicle seat, the occupant discrimination portion may enable transition from the no occupant state or the child seat fixed state to the adult seated state in a state in which the door opening and closing detecting portion detects the door closed state, and may prohibit transition from the no occupant state or the child seat fixed state to the adult seated state in a state in which the door opening and closing detecting portion detects the door open state.

According to the configuration above, in the door open state, it is prohibited to transition from the no occupant state or the child seat fixed state to the adult seated state. Thereby, in a case where the mounter mounts the child seat on the vehicle seat in the door open state, even if the load which is detected in the load detection device is temporarily increased during child seat mounting, it is possible for the occupant discrimination portion to reliably prevent transitioning from the no occupant state or the child seat fixed state to the adult seated state.

According to a fourth aspect of this disclosure, in the occupant discrimination system of a vehicle seat according to the first aspect, the occupant discrimination portion may prohibit transition from the adult seated state to the child seat fixed state in a state in which the door opening and closing detecting portion detects the door open state, and the occupant discrimination portion may enable transition from the adult seated state to the child seat fixed state within a predetermined period from a time at which the door opening and closing detecting portion detects switching from the door open state to the closed state, and prohibit transition from the adult seated state to the child seat fixed state after the predetermined period has elapsed.

According to a fifth aspect of this disclosure, there is provided an occupant discrimination system of a vehicle seat including a load detecting portion which is disposed on a lower side of a seat of the vehicle and which detects a load that acts on the seat, an occupant discrimination portion which discriminates a state of an occupant who is seated on the seat among a no occupant state, an adult seated state, and a child seat fixed state based on a state transition condition on the basis of a load which is detected from the load detecting portion and a load continuation duration, and a door opening and closing detecting portion which detects an opening and closing state of a door of the vehicle, in which the occupant discrimination portion prohibits transition from the adult seated state to the child seat fixed state in a state in which the door opening and closing detecting portion detects the door open state, and the occupant discrimination portion enables transition from the adult seated state to the child seat fixed state within a predetermined period from a time at which the door opening and closing detecting portion detects switching from the door open state to the closed state, and prohibits transition from the adult seated state to the child seat fixed state after the predetermined period has elapsed.

Typically, in a case where an adult occupant is discriminated as the adult seated state, there are times when the state transition condition is set in which transition from the adult seated state to the child seat fixed state occurs as little as possible, or transition from the adult seated state to the child seat fixed state is prohibited, in order to prevent the adult occupant state from transitioning from the adult seated state to the child seat fixed state by reducing the load which is detected in the load detection device due to a posture change of the adult occupant (for example, a state and the like in which the back is lifted in order to take the luggage of the rear seat). In this case, in a case where a mounting state of the child seat is discriminated as the adult seated state due to a temporary load increase when the mounter mounts the child seat on the vehicle seat, there is a concern that regarding the child seat it is difficult to transition from the adult seated state to the child seat fixed state, and the adult seated state is discriminated regardless of the child seat being placed on the vehicle seat.

Here, according to the configuration above, transition from the adult seated state to the child seat fixed state is prohibited in a state in which the door open state is detected, and transition from the adult seated state to the child seat fixed state is enabled within a predetermined period from a time at which switching is detected from the door open state to the door closed state. Then, transition from the adult seated state to the child seat fixed state is prohibited again after the predetermined period has elapsed. Thereby, even in a case where a state regarding the child seat is the adult seated state due to the temporary load increase when the child seat is fixed, transition from the adult seated state to the child seat fixed state is enabled within a predetermined period from a time at which switching is detected from the door open state to the door closed state. Typically, when mounting of the child seat ends, the door closed state from the door open state is confirmed by the inventors. Accordingly, transition from adult to child seat is enabled within a predetermined period from a time at which switching is detected from the door open state to the door closed state, and it is possible to suppress discrimination of the child seat as the adult seated state even after mounting of the child seat.

According to the aspects of this disclosure, it is possible to achieve an improvement of discrimination precision of child seat detection when the mounter mounts the child seat to the vehicle seat which is performed in the door open state.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An occupant discrimination system of a vehicle seat comprising:
   a load detecting portion which is disposed on a lower side of a seat of the vehicle and which detects a load that acts on the seat;
   an occupant discrimination portion which discriminates a state of an occupant who is seated on the seat among a no occupant state, an adult seated state, and a child seat fixed state based on a state transition condition on the basis of a load which is detected from the load detecting portion and a load continuation duration; and
   a door opening and closing state detecting portion which detects an opening and closing state of a door of the vehicle,
   wherein the occupant discrimination portion sets a first continuation duration which is a state transition condition for transitioning from the no occupant state or the child seat fixed state to the adult seated state in a state in which the door opening and closing detecting portion detects the door open state to be longer than a second continuation duration which is a state transition condition for transitioning from the no occupant state or the child seat fixed state to the adult seated state in a state in which the door opening and closing detecting portion detects the door closed state.

2. The occupant discrimination system of a vehicle seat according to claim 1,
   wherein the occupant discrimination portion prohibits transition from the adult seated state to the child seat fixed state in a state in which the door opening and closing detecting portion detects the door open state, and
   the occupant discrimination portion enables transition from the adult seated state to the child seat fixed state within a predetermined period from a time at which the door opening and closing detecting portion detects switching from the door open state to the closed state, and prohibits transition from the adult seated state to the child seat fixed state after the predetermined period has elapsed.

3. An occupant discrimination system of a vehicle seat comprising:
   a load sensor which is disposed on a lower side of a seat of the vehicle and which detects a load that acts on the seat;

a door opening and closing state detecting portion which detects an opening and closing state of a door of the vehicle; and a controller which discriminates a state of an occupant who is seated on the seat among a no occupant state, an adult seated state, and a child seat fixed state based on a state transition condition on the basis of a load which is detected from the load sensor and a load continuation duration, wherein the controller sets a first continuation duration which is a state transition condition for transitioning from the no occupant state or the child seat fixed state to the adult seated state in a state in which the door opening and closing state detecting portion detects the door open state to be longer than a second continuation duration which is a state transition condition for transitioning from the no occupant state or the child seat fixed state to the adult seated state in a state in which the door opening and closing state detecting portion detects the door closed state.

4. The occupant discrimination system of a vehicle seat according to claim 3, wherein the controller prohibits transition from the adult seated state to the child seat fixed state in a state in which the door opening and closing state detecting portion detects the door open state, and the controller enables transition from the adult seated state to the child seat fixed state within a predetermined period from a time at which the door opening and closing state detecting portion detects switching from the door open state to the closed state, and prohibits transition from the adult seated state to the child seat fixed state after the predetermined period has elapsed.

* * * * *